(12) United States Patent
Peter

(10) Patent No.: US 9,819,784 B1
(45) Date of Patent: Nov. 14, 2017

(54) SILENT INVOCATION OF EMERGENCY BROADCASTING MOBILE DEVICE

(71) Applicant: MICROSOFT TECHNOLOGY LICENSING, LLC, Redmond, WA (US)

(72) Inventor: Arockiarajesh Peter, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/144,336

(22) Filed: May 2, 2016

(51) Int. Cl.
| | |
|---|---|
| *H04W 4/22* | (2009.01) |
| *H04M 1/725* | (2006.01) |
| *H04W 4/12* | (2009.01) |
| *H04W 4/02* | (2009.01) |

(52) U.S. Cl.
CPC ... *H04M 1/72538* (2013.01); *H04M 1/72552* (2013.01); *H04M 1/72569* (2013.01); *H04M 1/72577* (2013.01); *H04W 4/023* (2013.01); *H04W 4/12* (2013.01); *H04W 4/22* (2013.01)

(58) Field of Classification Search
CPC ..... H04W 4/22; H04W 76/00; H04W 76/007; H04W 76/06; H04W 4/14; H04W 4/02; H04W 4/16; H04W 76/02; H04M 3/51; H04M 3/5116; H04M 2242/00; H04M 2242/04; H04M 3/5125; H04M 3/5133; H04M 3/5183; H04M 3/52;
(Continued)

(56) References Cited

U.S. PATENT DOCUMENTS

| | | |
|---|---|---|
| 5,515,419 A | 5/1996 | Sheffer |
| 5,555,286 A | 9/1996 | Tendler |
| 6,028,514 A | 2/2000 | Lemelson et al. |
| (Continued) | | |

FOREIGN PATENT DOCUMENTS

| | | | | |
|---|---|---|---|---|
| CN | WO 2015024188 A1 * | 2/2015 | ........ | H04M 1/72536 |
| DE | 10058637 A1 | 5/2002 | | |
| (Continued) | | | | |

OTHER PUBLICATIONS

"Homeland Security News", Published on: Aug. 15, 2006 Available at: http://www.nationalterroralert.com/communications/.

*Primary Examiner* — Meless Zewdu
(74) *Attorney, Agent, or Firm* — Stock, Hardy & Bacon L.L.P.

(57) ABSTRACT

Systems and methods are disclosed for discreetly broadcasting emergency communications to emergency contacts from a mobile computing device. To accomplish the foregoing, a shutdown command is received on a mobile computing device to initiate a shutdown process. In accordance with the shutdown process, the mobile computing device monitors for a preconfigured passcode, picture, or combination of inputs to authorize the actual shutdown of the mobile computing device. Based on determining that the received passcode, picture, or combination of inputs is different than their preconfigured counterparts, a pseudo-shutdown mode is enabled, emulating an actual shutdown of the mobile computing device. The emergency broadcast mode of the mobile computing device is also started when the pseudo-shutdown mode enabled, to discreetly alert emergency contacts with emergency mode data generated by the mobile computing device.

20 Claims, 8 Drawing Sheets

(58) Field of Classification Search
CPC .. H04M 2242/02; G08B 25/016; H04L 15/22; H04L 15/24; H04L 15/26; H04B 1/034; G01S 5/0231
See application file for complete search history.

(56) References Cited

U.S. PATENT DOCUMENTS

| | | |
|---|---|---|
| 7,983,654 B2 | 7/2011 | Shelton et al. |
| 8,013,734 B2 | 9/2011 | Saigh et al. |
| 9,142,110 B2 | 9/2015 | Fish et al. |
| 2006/0166659 A1 | 7/2006 | Wiese et al. |
| 2008/0299941 A1 | 12/2008 | Stephens, Jr. |
| 2011/0275343 A1 | 11/2011 | Kollar |
| 2014/0011469 A1* | 1/2014 | Fenn et al. ............ 455/404.1 |
| 2014/0031001 A1* | 1/2014 | Jacobsen ............... 455/404.2 |
| 2015/0050945 A1 | 2/2015 | Samuel et al. |

FOREIGN PATENT DOCUMENTS

| | | |
|---|---|---|
| EP | 0936794 A2 | 8/1999 |
| WO | 2014150379 A1 | 9/2014 |

* cited by examiner

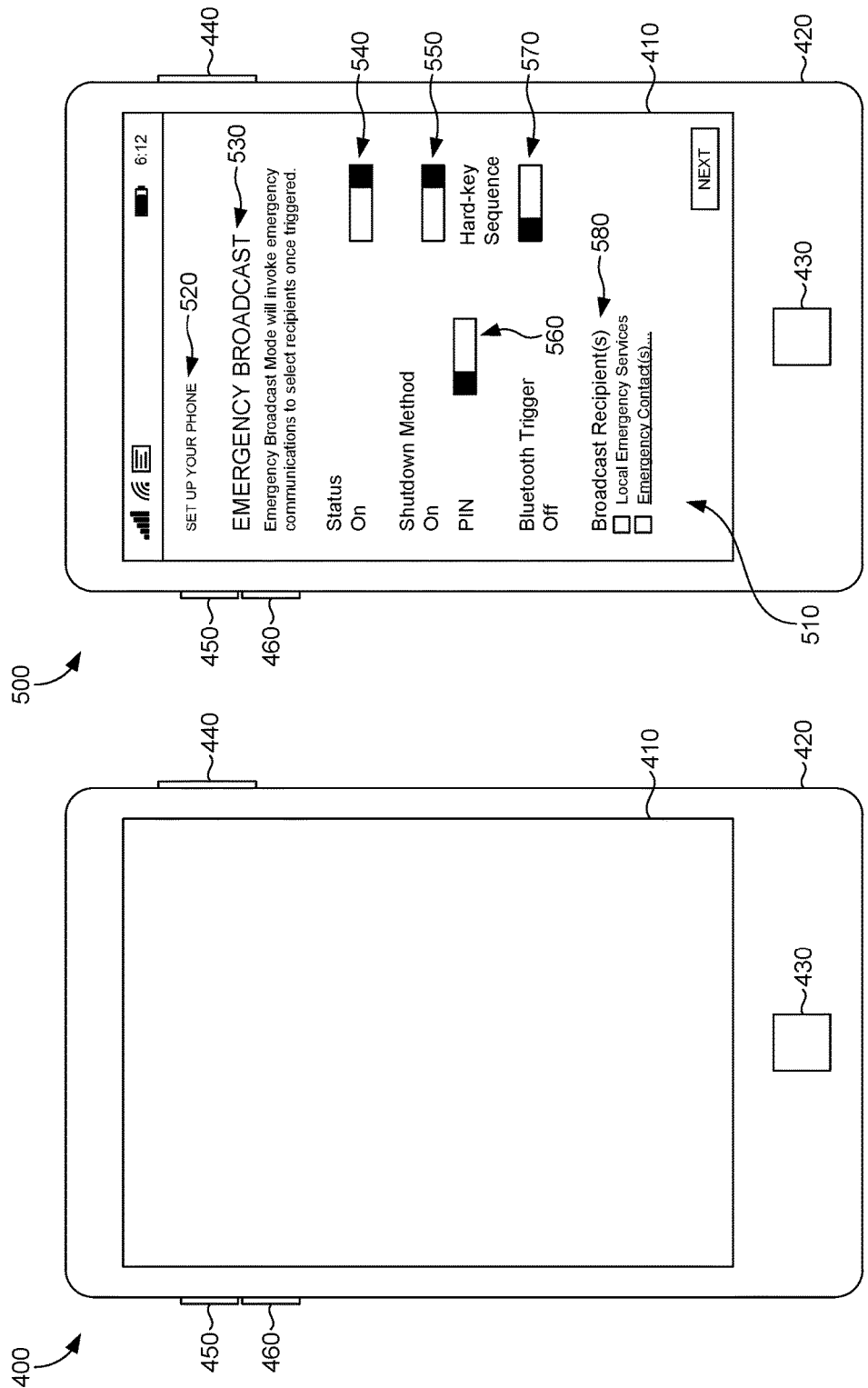

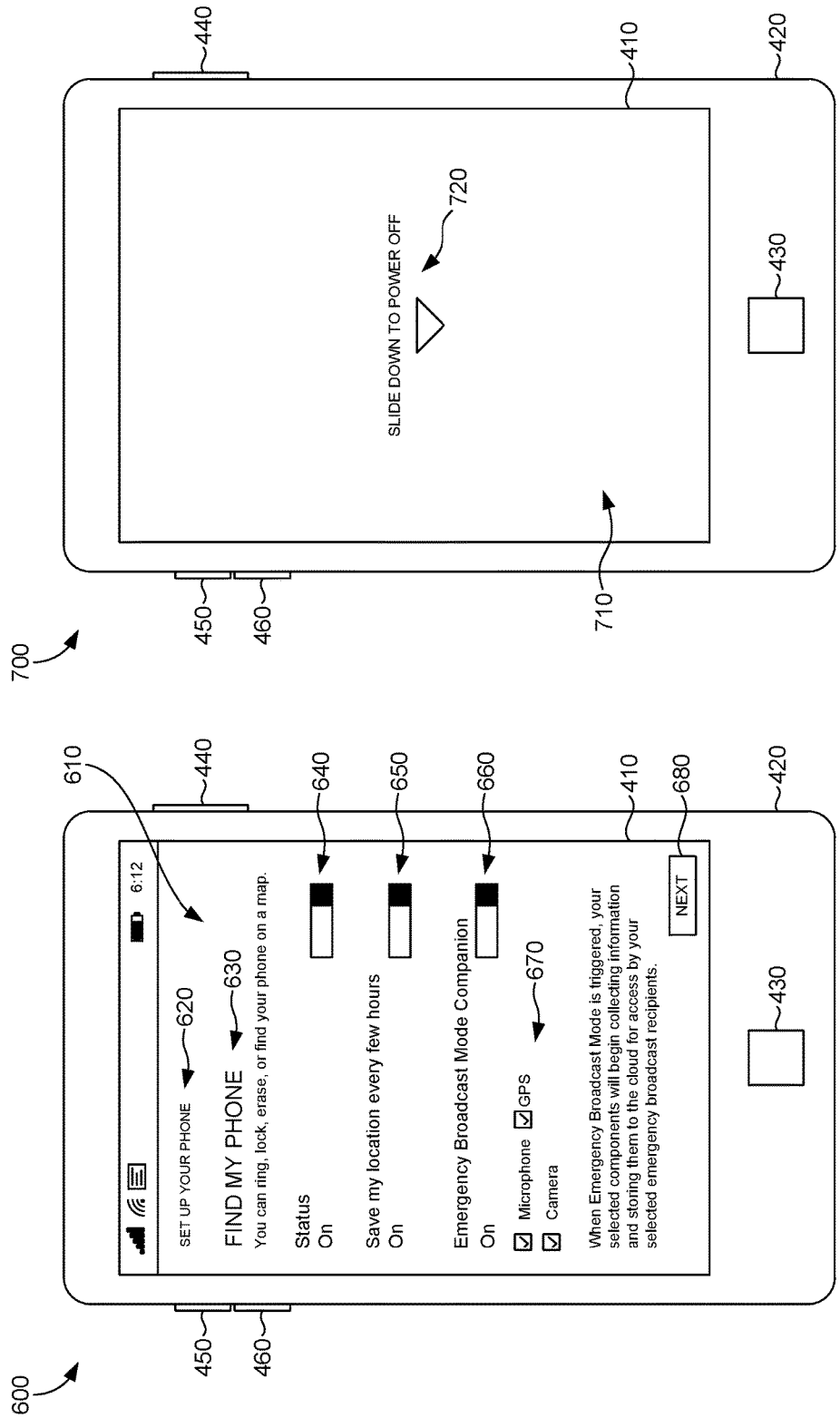

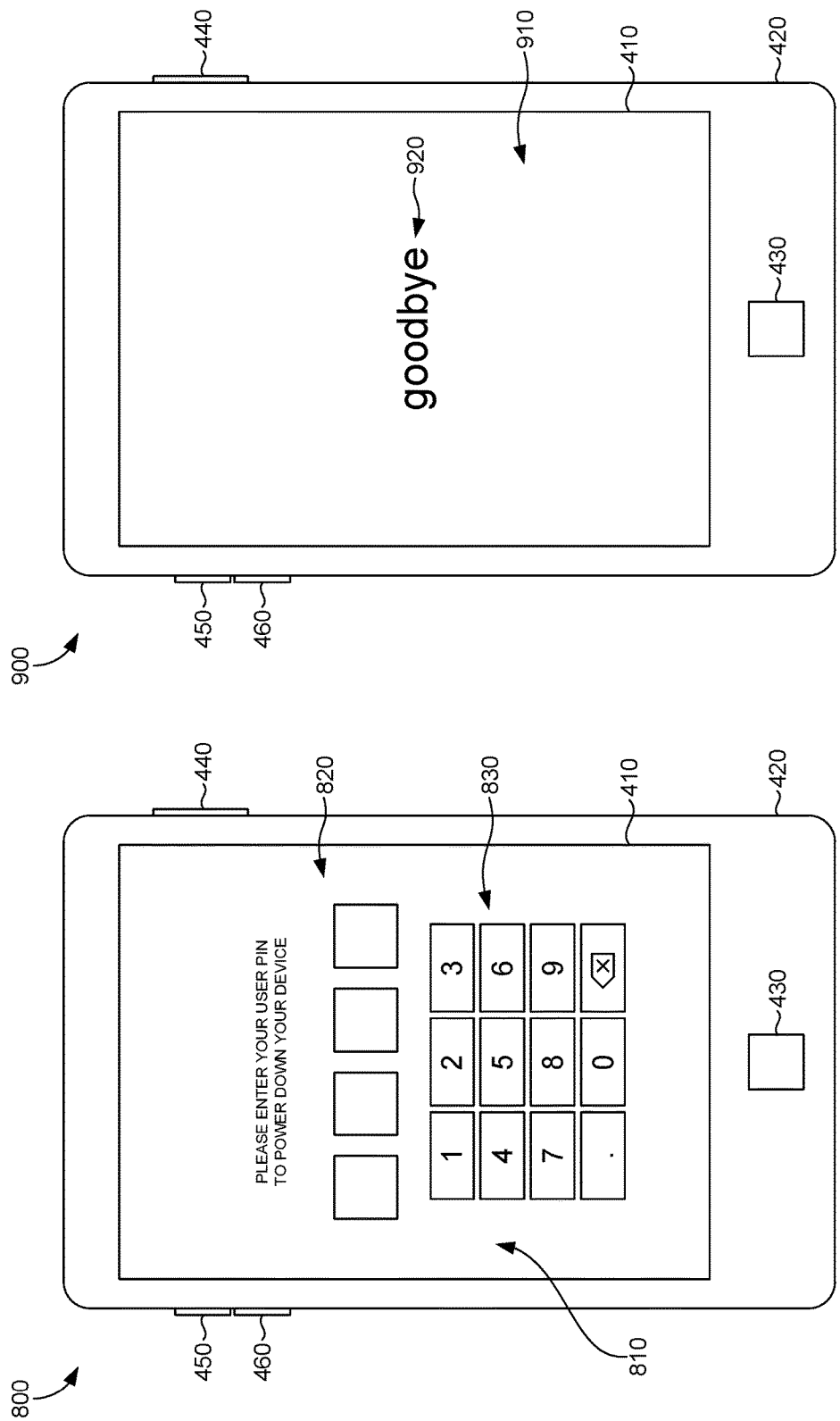

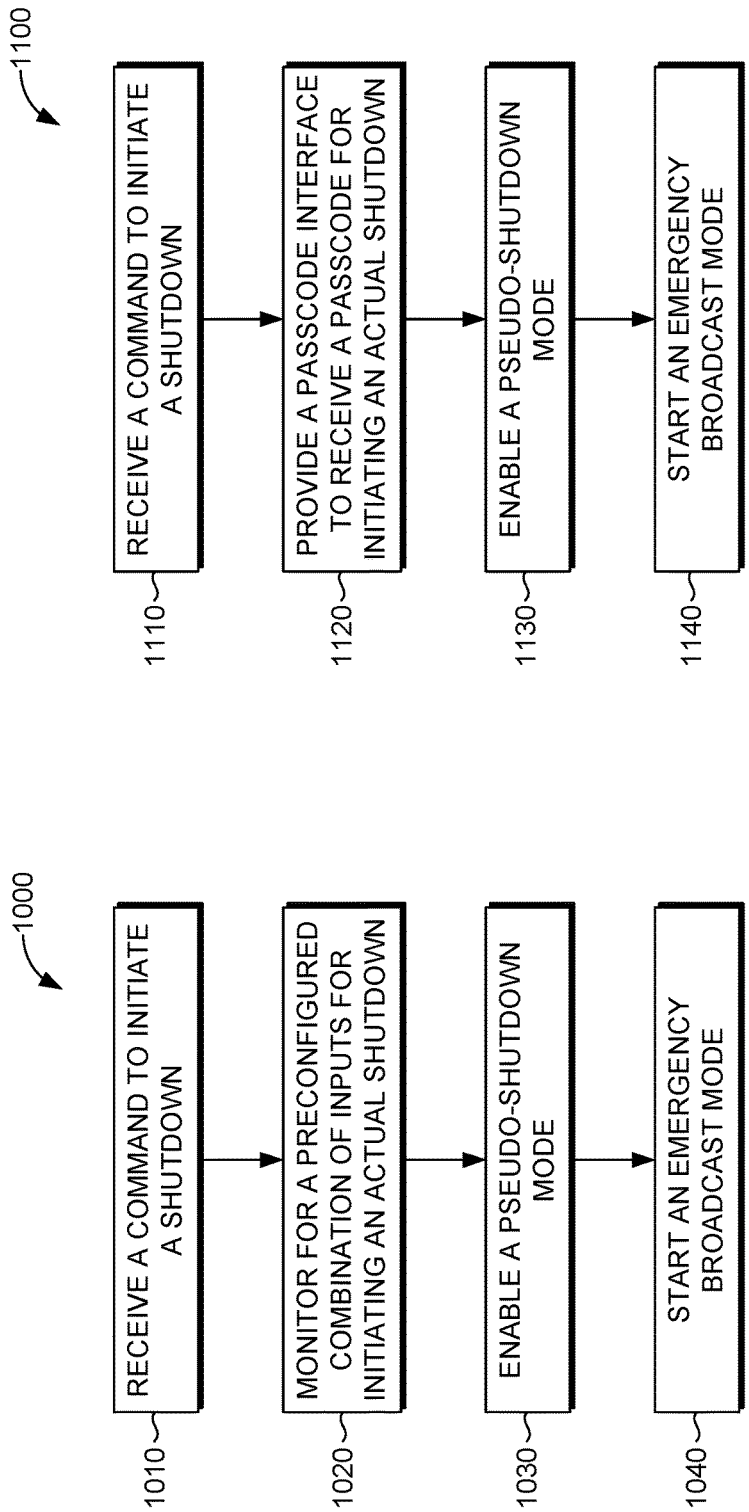

SILENT INVOCATION OF EMERGENCY BROADCASTING MOBILE DEVICE

BACKGROUND

Users oftentimes rely on smartphones to communicate with loved ones when in difficult situations. In direr situations, users will rely on smartphones to communicate with local emergency service providers. In either circumstance, smartphones have become one of the most, if not the most, widely-adopted means for communication in emergency situations. Smartphones enable users to make phone calls and send electronic messages (e.g., texts, emails) to others who can assist in various emergency situations. Moreover, smartphone location technologies, such as GPS, have been instrumental in assisting users identify their locations when they are lost, and have even helped others identify a lost or missing user's location.

In certain, particularly life-threatening situations, a smartphone user may be unwilling or unable to initiate an outgoing emergency communication. When under the apprehension of an immediate threat, a smartphone user would most likely not make a phone call or send a text message in the presence of their disapproving aggressor. To this end, a system or method for discreetly initiating an emergency broadcast from a smartphone would be highly beneficial.

SUMMARY

Embodiments described herein are directed to discreetly broadcasting personal emergency alerts. More specifically, embodiments are directed to systems and methods for discreetly initiating and broadcasting an emergency broadcast signal. In some embodiments, a shutdown command is received to initiate a shutdown process of a mobile computing device. During the mobile computing device shutdown process, the mobile computing device monitors for a preconfigured combination of inputs for initiating an actual shutdown of the mobile computing device. A pseudo-shutdown mode that emulates an actual shutdown of the mobile computing device is enabled based on the receipt of a different combination of hard-key inputs that conflicts with the preconfigured combination of hard-key inputs or based on no hard-key inputs being received within a predefined duration of time. The emergency broadcast mode of the mobile computing device is then started, based on the pseudo-shutdown mode being enabled.

In further embodiments, responsive to receiving a shutdown command on a mobile computing device, a passcode interface is provided for display to receive a passcode for initiating an actual shutdown of the mobile computing device. A determination is made that either no passcode is received, or the received passcode is different than a preconfigured passcode for initiating the actual shutdown of the mobile computing device. Based on the preconfigured emergency passcode not being received, a pseudo-shutdown mode of the mobile computing device is enabled. The emergency broadcast mode of the mobile computing device is then started, based on the pseudo-shutdown mode being enabled.

In other embodiments, responsive to receiving a shutdown command on a mobile computing device, a passcode interface is provided for display to receive a passcode for authorizing the shutdown process. A determination is made that the received passcode is either a null value or an incorrect passcode that does not correspond to a valid, preconfigured passcode. Based on the determination that the received passcode is either a null value or an incorrect passcode, a pseudo-shutdown mode of the mobile computing device is enabled. The emergency broadcast mode of the mobile computing device is then started, based on the pseudo-shutdown mode being enabled.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 is a graphical representation of an exemplary mobile computing device, in accordance with some implementations of the present disclosure;

FIG. 5 is an illustration of an exemplary user interface for configuring an emergency broadcast mode of the exemplary mobile computing device of FIG. 4, in accordance with some implementations of the present disclosure;

FIG. 6 is an illustration of an exemplary user interface for configuring a tracking service of the exemplary mobile computing device of FIG. 4, in accordance with some implementations of the present disclosure;

FIG. 7 is an illustration of an exemplary user interface for initializing a shutdown process of the exemplary mobile computing device of FIG. 4, in accordance with some implementations of the present disclosure;

FIG. 8 is an illustration of an exemplary user interface for receiving a passcode of the exemplary mobile computing device of FIG. 4, in accordance with some implementations of the present disclosure;

FIG. 9 is an illustration of an exemplary user interface displaying an indicator of the shutdown process of the exemplary mobile computing device of FIG. 4, in accordance with some implementations of the present disclosure;

FIG. 10 is flow diagram showing a method for initiating and broadcasting an emergency broadcast signal, in accordance with some implementations of the present disclosure;

FIG. 11 is flow diagram showing another method for initiating and broadcasting an emergency broadcast signal, in accordance with some implementations of the present disclosure.

DETAILED DESCRIPTION

Figure 1:
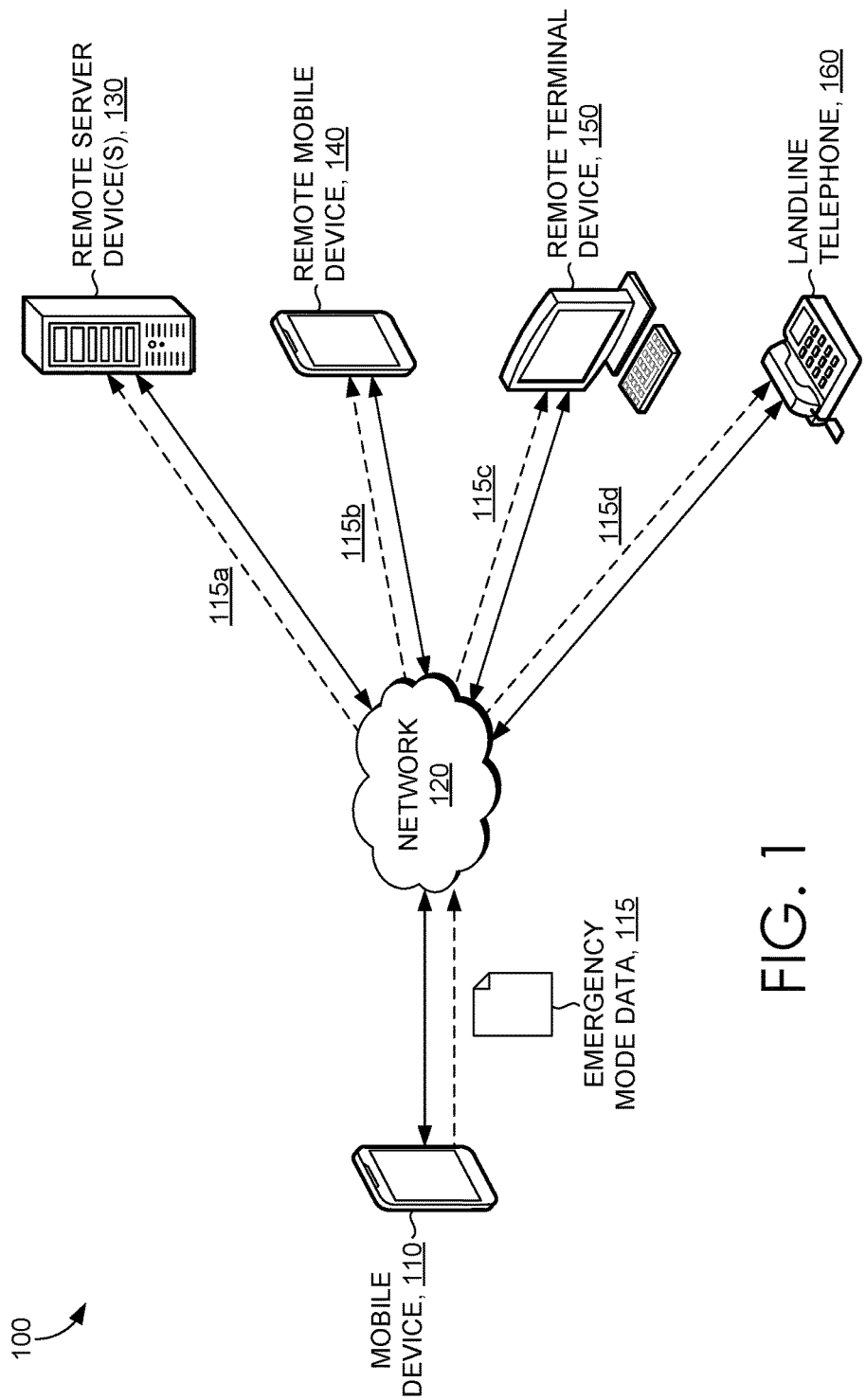
FIG. 1 is a diagram illustrating an exemplary system environment, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Generally speaking, initiating emergency communications on a mobile computing device (e.g., a smartphone) requires a lengthy process. The most common way to initiate emergency communications on a mobile computing device is no different than making a typical phone call or sending a typical electronic message on the mobile computing device. More particularly, the process requires that a user wake up the device, unlock the device, locate and select the appropriate application for execution, select the emergency contact, and finally initiate the communication to communicate the emergency message. In situations when an electronic message is the form of communication, the user must also input the electronic message to the mobile computing device. This process, particularly in life-threatening situations, is painstakingly arduous and complicated in high-conflict situations, and clearly obvious in the eyes of an aggressor or imminent threat.

Emergency broadcasts can be sent from a mobile computing device on the application level. More specifically, various applications have been developed for quickly contacting local emergency service providers or emergency contacts upon execution of such an application. However, like the aforementioned methods for making calls or sending messages, executing an emergency broadcasting application can also require a number of steps and can be very obvious to the aggressor or threat.

In some instances, mobile computing device users find themselves in life-threatening situations where they cannot initiate communications with their emergency contacts. By way of example, a taxi driver finds himself in a life-threatening situation after a passenger unexpectedly becomes volatile in the back seat of the cab. The driver believes that picking up his smartphone to call the police or signal for help may further aggravate the passenger. As such, the driver finds himself in a seemingly hopeless situation with no way to reach out for help. In another example, a victim held at gunpoint by a ruffian may be told to turn off his smartphone. The victim has no choice but to do as told, feeling hopeless with no way to reach out for help. In grave situations, particularly when an aggressor is involved, smartphone users can find themselves devoid of any reasonable option to signal for help. In this regard, a discreet method for reaching out to emergency contacts in emergency situations would be highly beneficial.

Embodiments of the present disclosure describe systems and methods for discreetly initiating and broadcasting personal emergency alerts. More specifically, employing embodiments described herein, a mobile computing device user can discreetly initiate an emergency broadcast mode of a mobile computing device. Upon initiation, an emergency broadcast comprising emergency mode data is sent to emergency contacts in a manner that is undetectable and not obvious to an aggressor or potential threat. In some embodiments, an emergency broadcast mode can be enabled by a user, for instance, when they are told to power down their device. In this regard, the mobile computing device can enter a pseudo-shutdown mode such that any communications to and from the mobile computing device are performed while the mobile computing device appears deactivated. In other embodiments, the emergency broadcast mode can be enabled by a user via a wireless trigger. To this end, the mobile computing device can initiate outgoing emergency communications from the mobile computing device discreetly, without any indication that outgoing emergency communications are being sent therefrom.

Turning now to FIG. 1, a diagram is provided illustrating an exemplary system environment in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client-only or a client-server system that can be utilized to initiate, broadcast, and/or receive personal emergency communications. Among other components not shown, the system 100 can include any number of mobile computing devices, such as subject mobile device 110, for broadcasting emergency mode data 115 via a network 120. In accordance with some embodiments described herein, emergency mode data 115 can include subject mobile device 110 location information (e.g., GPS coordinates, cell tower data), and/or subject mobile device 110 recorded media (e.g., audio, video, pictures). In accordance with some further embodiments described herein, emergency mode data 115 can include voice data, such as live telecommunications data, and/or subject mobile device 110 generated text-to-speech data. The system 100 can further include one or more remote devices, such as remote server device 130, remote mobile device 140, remote terminal device 150, and/or remote landline telephone 160. It should be understood that any number of the aforementioned devices may be employed in system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers, subject mobile devices, remote mobile devices, terminal devices, and/or landline telephones shown in FIG. 1 may be implemented via a computing device, such as computing device 1200, later described with reference to FIG. 12, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, one or more private networks, and/or one or more telecommunications networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In accordance with embodiments of the present disclosure, the subject mobile device 110 or the remote mobile device 140 can be a computing device that is capable of accessing the Internet, such as the World Wide Web, and/or a telecommunications network. Either one of the subject mobile device 110 and remote mobile device 140 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smartphone, a smart watch, a workstation, any combination of these delineated devices, or any other suitable device.

Each remote server device 130 can include one or more processors, and one or more computer-readable media. The computer-readable media may include computer-readable instructions executable by the one or more processors. As one of ordinary skill in the art may appreciate, the instructions can correspond to a tracking service (not shown) for tracking one or more mobile computing devices, such as subject mobile device 110, based on location information received therefrom via the network 120. One example of a tracking service is the Microsoft® Find My Phone service. In embodiments, the tracking service can also receive emergency mode data 115a from the subject mobile device 110 via the network 120. The emergency mode data 115a can be received by the remote server 130, stored in a memory of the remote server 130, and provided to a remote device, such as remote mobile device 140 or remote terminal device 150, over the network 120 for consumption by a user thereof. While the standard transmission protocol for communication between the subject mobile device 110 and server(s) 130 is TCP/IP, it is contemplated that any network protocol can be used to communicate the emergency mode data 115a there between.

In one embodiment, the one or more remote server devices 130 may include a web server (not shown), such as ITS® or Apache®, and the tracking service can employ the web server to provide a front-end webpage GUI to remote devices for review and consumption of the emergency mode data 115a. In another embodiment, the one or more remote server devices 130 may include an application service (not shown), and the tracking service can employ the application service to provide a web or cloud-based application to remote devices for review and consumption of the emergency mode data 115a. In embodiments described herein, the remote server device 130 can, at a minimum, receive the emergency mode data 115a for storage in association with a user account associated with the subject mobile device 110, and further provide an interface for display on one or more authorized remote devices, for accessing and reviewing the emergency mode data 115a associated with the subject mobile device 110.

As was described herein above, the remote mobile device 140 can be a computing device coupled to the network 120, and capable of accessing the Internet and/or a telecommunications network. In some configurations, the remote mobile device 140 can be another subject mobile device, such as subject mobile device 140. In embodiments described herein, the remote mobile device 140 can, at a minimum, receive the emergency mode data 115b from the subject mobile device 110 via the network 120, and further provide (e.g., display or playback) at least some portions of the emergency mode data 115b thereon. In some embodiments, the emergency mode data 115, 115b can be transmitted by way of electronic message, including at least one of an SMS text, email, messaging application transmission, and the like. In other embodiments, the emergency mode data 115, 115b can be transmitted by way of telephone call. For instance, a call can be initiated by the mobile device 110 and connected therefrom to the remote mobile device 140. Based on the connection there between, the emergency mode data 115, 115b can be communicated from the mobile device 110 to the remote mobile device 140 in the form of received voice data (i.e., standard voice call data) and/or subject mobile device 110 generated text-to-speech data based on the emergency mode data 115b (e.g., location information).

In accordance with some embodiments described herein, the remote terminal device 150 can be a computing device that is capable of accessing a telecommunications network and/or the Internet. The remote terminal device 150 might take on a variety of forms, such as a personal computer (PC), a laptop computer, a dispatch control system, a handheld communications device, a workstation, any combination of these delineated devices, or any other suitable device. In embodiments, the remote terminal device 150 can be a computing device that can receive electronic messages via the network 120. In other words, the remote terminal device 150 is comprised of one or more computing devices that can receive the emergency mode data 115c from the subject mobile device 110 via the network 120, and further provide for review (e.g., display or playback) at least some portions of the emergency mode data 115c thereon. In some embodiments, based on characteristics (e.g., data-enabled) of the connection between the subject mobile device 110 and the remote terminal device 150, the emergency mode data 115, 115c can be transmitted by way of electronic message, including at least one of an SMS text, email, messaging application transmission, and the like.

In other embodiments, the emergency mode data 115, 115c can be transmitted by way of a telephone call. For instance, a call can be initiated by the mobile device 110 and connected therefrom to the remote terminal device 150. Based on characteristics of the connection there between (e.g., voice only connection, no data), the emergency mode data 115, 115c can be communicated from the mobile device 110 to the remote terminal device 140 in the form of received voice data (i.e., voice call data picked up by a microphone) and/or subject mobile device 110 generated text-to-speech data based on the emergency mode data 115b (e.g., personally-identifying and current location information). In other words, the emergency mode data 115, 115c is communicated as audio, including at least one of microphone input data of the mobile device 110, and one or more computer-generated audio files that comprise text-to-speech converted emergency mode data 115, 115c. In accordance with embodiments described herein, the computer-generated audio files can include, among other things, the subject mobile device 110 user's name, phone number, GPS coordinates, emergency contacts, and the like.

In accordance with further embodiments described herein, the landline telephone 160 can be any telephone device (e.g., analog or digital) capable of accessing a telecommunications network, such as network 120. In other words, the landline telephone 160 is comprised of a telecommunications device that can answer an incoming telephone call from the subject mobile device 110 via the network 120, and receive the emergency mode data 115*d* in the form of audible voice data for live playback thereon. For instance, a call can be initiated by the mobile device 110 and connected therefrom to the landline telephone 160. Based on characteristics of the connection there between (e.g., voice only connection, no data), the emergency mode data 115, 115*d* can be communicated from the mobile device 110 to the remote terminal device 140 in the form of received voice data (i.e., voice call data picked up by a microphone) and/or subject mobile device 110 generated text-to-speech data based on the emergency mode data 115*d* (e.g., personally-identifying and current location information). In other words, the emergency mode data 115, 115*d* is communicated as audio, including at least one of microphone input data of the mobile device 110, and one or more computer-generated audio files that comprise text-to-speech converted emergency mode data 115. In accordance with embodiments described herein, the computer-generated audio files can include, among other things, the subject mobile device 110 user's name, phone number, GPS coordinates, emergency contacts, and the like.

Figure 2:
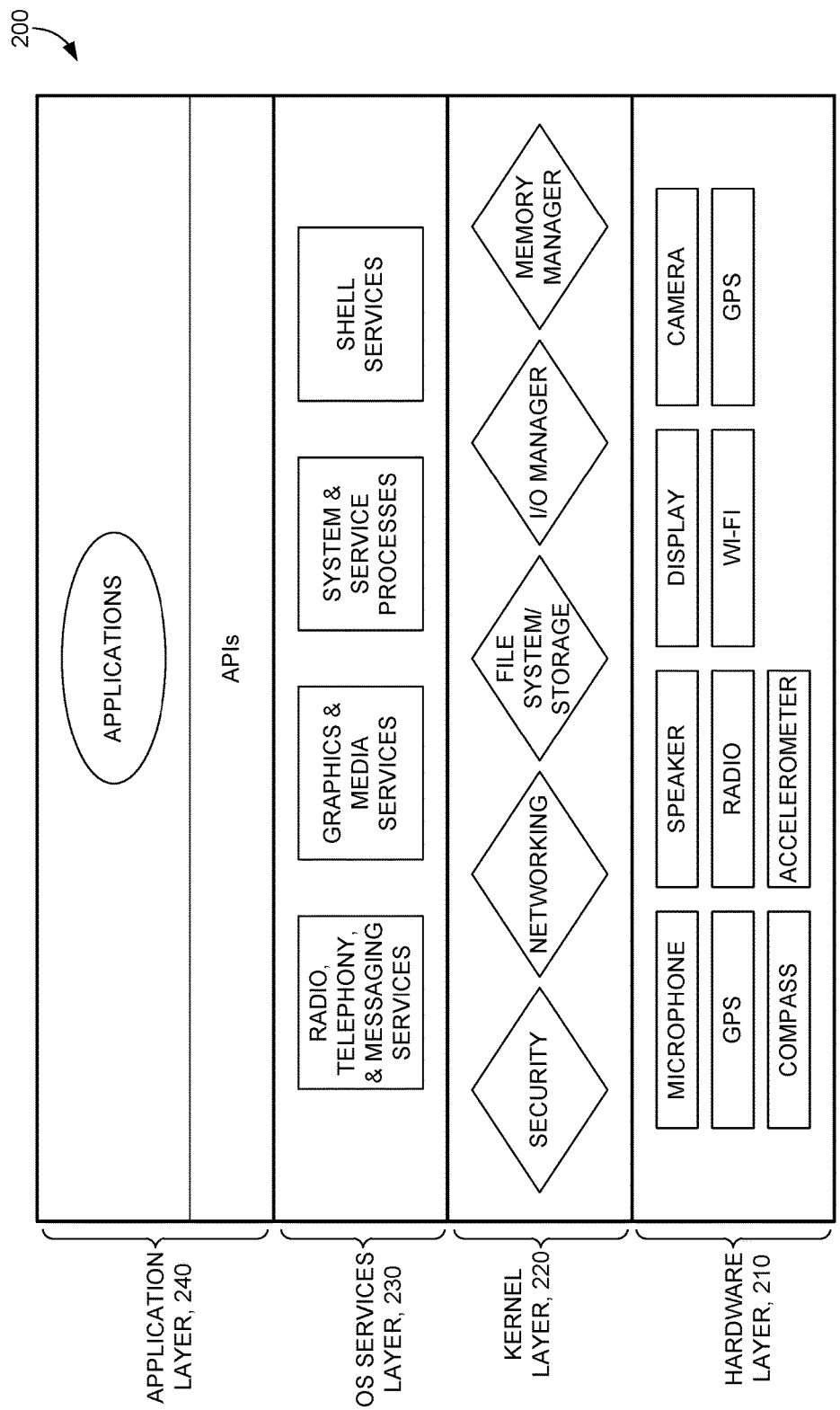
FIG. 2 is a diagram illustrating an exemplary architectural framework of a mobile computing device, in accordance with some implementations of the present disclosure.

Looking now to FIG. 2, a diagram illustrating an exemplary application architecture framework 200 of a mobile computing device in accordance with embodiments described herein is provided. The mobile computing device, such as subject mobile device 110 of FIG. 1, is configured to operate (e.g., run an operating system, execute applications, perform operations) on an architectural framework 200 having, among other things, a hardware layer 210, a kernel layer 220, an OS services layer 230, and an application layer 240. In embodiments, the hardware layer 210 is, in essence, the physical layer of the mobile computing device. In other words, the hardware layer 210 is the portion of the architectural framework 200 that translates logical communication requests from the core operating system (e.g., the kernel layer 220) directly into hardware-specific operations to affect transmission or reception of electronic signals between the core operating system and the hardware components. As illustrated within the hardware layer 210, the mobile computing device can include a variety of hardware components, including at least a microphone, speaker, radio, display, GPS radio, hard-key input buttons, and the like. In further embodiments, the mobile computing device can also include a camera, Wi-Fi radio, compass, accelerometer, and other components generally found in smartphones or other mobile computing devices.

The kernel layer 220 is, in essence, the central core of the mobile computing device. In other words, the kernel layer 210 is the portion of the architectural framework 200 that constitutes the core of the mobile computing device's operating system. Among other things, the kernel layer 210 can manage the startup of the mobile computing device, system security, networking, file system and storage, input and output requests from software, communication with hardware components (for instance, components of hardware layer 210), and can translate the requests into data processing instructions for the CPU.

The OS services layer 230 is the portion of the architectural framework 200 that can provide specific and defined services to other components or applications. More specifically, and by way of example only, the OS services layer 230 can include system services directed to telecommunications radio operations, telephony-related operations (e.g., making and receiving calls), messaging-related operations (e.g., sending and receiving electronic messages), graphics and media-related operations (e.g., displaying and refreshing user interfaces or media), system and service processes (e.g., background processes), and/or shell services. In embodiments, background processes executing in the OS services layer 230 can remain undetectable when executing on the mobile computing device. As such, when certain inputs are received by the mobile computing device, the inputs can be immediately recognized by the background process. To this end, operations can be executed immediately in response to these inputs. By way of example only, components of the OS services layer 230 can listen for touch input (e.g., a touch gesture), decipher the gesture, and execute an OS-level operation (e.g., zoom-in, zoom-out) corresponding to the detected gesture. Inputs such as these are commonly known and utilized by everyday smartphone users. In another example, in general operating states of a mobile computing device, the OS service layer 230 components can listen for hardware button inputs, such as volume rocker presses, home key presses, power button presses, and the like. In response to receiving such inputs, corresponding operations (e.g., turning up/down the volume, returning to the home screen, initiating a shutdown process, etc.) within the operating system environment can be initiated accordingly in response to receiving the inputs.

At the highest level, the application layer 240 is the portion of the architectural framework 200 that directly interacts with the end user. More specifically, graphical user interfaces, web browsers, messaging clients, virtual terminals, file system managers, and the like, are all applications and/or services of the application layer 240. Generally speaking, any application that is installed and/or executing on the mobile computing device is running in the application layer 240. Applications executing within the application layer 240 can make API calls to the OS services layer 230, which communicates instructions to the kernel layer 220 for ultimate translation for delivery to one or more components in the hardware layer 210 for the control thereof.

A mobile computing device, such as subject mobile device 110 of FIG. 1, can include a memory for storing code and/or instructions for conducting operations associated with the operating system and various applications installed thereon based on the architectural framework 200 of FIG. 2. Because most mobile device applications are installed for operation on the application layer 240 of the mobile computing device, the initiation of operations typically associated with such applications are limited to the appropriate application GUIs. The standard hardware key inputs, on the other hand, are generally limited to operating system-level operations, such as adjusting the volume, returning to the home screen, powering down the phone, adjusting the ringer or vibration feature, and more. In order to make the invocation process of an emergency broadcast discreet, the process must be taken away from the typical application-based graphical user interface. As such, embodiments in accordance with the present disclosure are directed to the discreet initiation of an emergency broadcast mode on a mobile computing device, such that the processes associated with the emergency broadcast mode are executed primarily in the OS services layer (e.g., as an executing background service). In some embodiments, the emergency broadcast mode can disable indicator lights, display outputs, audio outputs, and any other output device that would indicate that the phone was either turned on or in operation.

Figure 3:
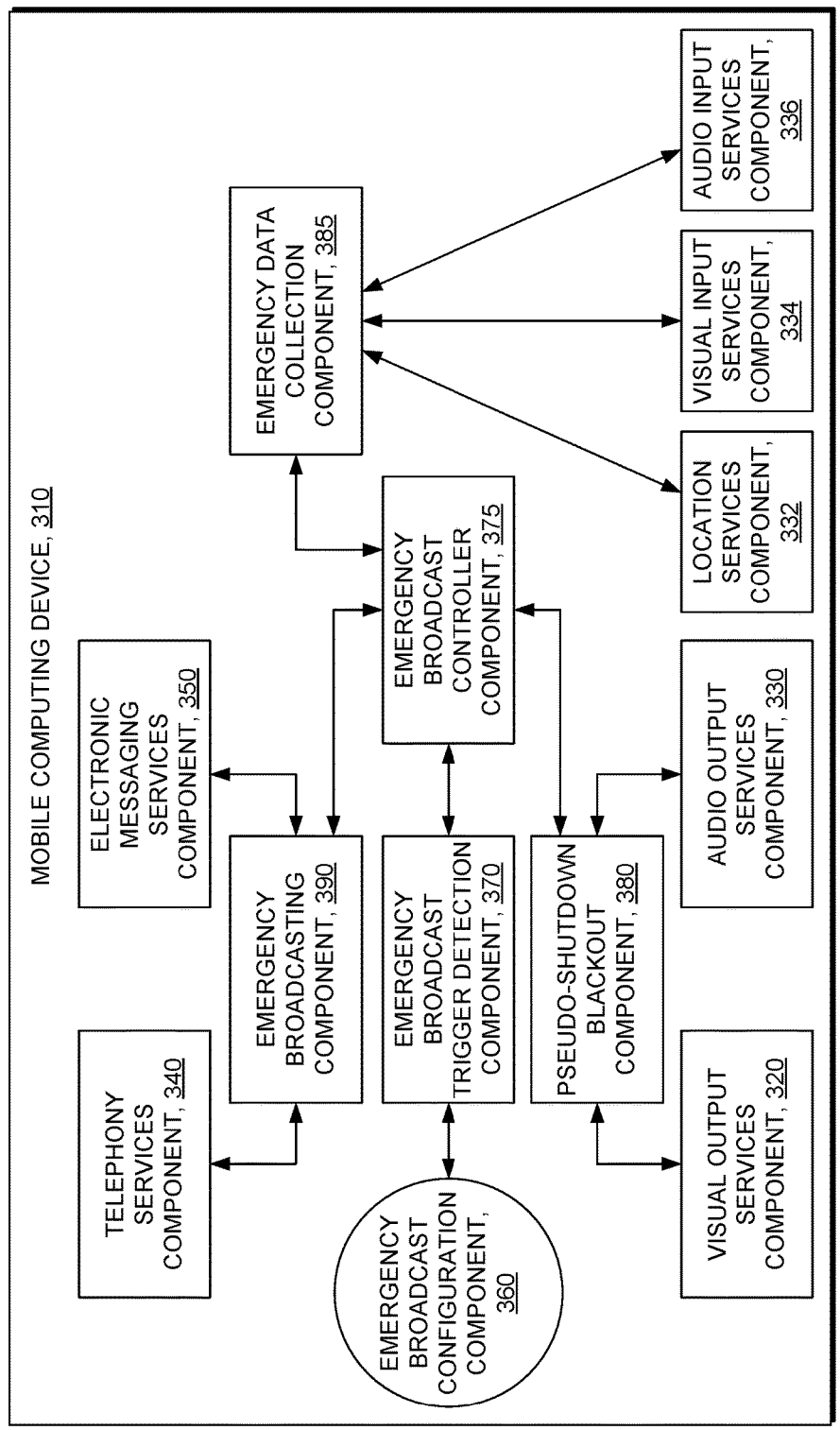
FIG. 3 is a flow diagram showing interactions between some components of a mobile computing device, in accordance with some implementations of the present disclosure.

Turning now to FIG. 3, a block diagram 300 showing a flow of interactions between some components of a mobile computing device 310 is provided. The block diagram 300 includes graphical representations of components that can implement an emergency broadcast mode in accordance with some embodiments described herein. In the block diagram 300, the components are each shaped in accordance with the corresponding layer (for instance, layers 210, 220, 230, 240 of FIG. 2) in which the component is implemented. In other words, components shaped as an ellipse/circle, such as emergency broadcast configuration component 360, are included in the application layer (e.g., application layer 240 of FIG. 2), while components 370-390 shaped as a rectangle/square are included in the OS services layer (e.g., OS services layer 230 of FIG. 2). While the provided block diagram 300 demonstrates some embodiments of the present disclosure, it is contemplated that the emergency broadcast mode configuration, initiation, and operation can be embodied in many other configurations. For instance, any one of the described components can be implemented in "higher" layers (e.g., the application layer), implemented in "lower" layers (e.g., the kernel layer), or alternatively implemented as a combination of the layers described in reference to FIG. 2.

In embodiments, the mobile computing device 310 includes basic components that can be found in most mobile phones. More specifically, the mobile computing device 310 can include visual output services component 320, audio output services component 330, location services component 332, visual input services component 334, audio input services component 336, telephone services component 340, and electronic messaging services component 350. Each of these components 310, 320, 330, 340 are implemented at least in part in the OS services layer, such as OS services layer 230 of FIG. 2, and can receive instructions from an application or other components to perform general services of the mobile computing device 310. The provided arrows are merely illustrating the flow of data or instructions between components, in accordance with some embodiments, and are not intended to be limiting in any way.

In more detail, the visual output services component 320 can receive one or more instructions to control the visual output-based hardware of the mobile computing device 310. The visual output-based hardware can include a display, a touchscreen, LED lights, camera lights, background lights, button backlights, and the like. Among other things, the visual output services component 320 can at least enable the visual output-based hardware to provide graphics for display on the mobile computing device 310 based on received instructions, or disable the visual output-based hardware based on received instructions.

Similarly, the audio output services component 330 can receive one or more instructions to control the audio output-based hardware of the mobile computing device 310. The audio output-based hardware can include an internal speaker, a chassis speaker, a telephone speaker, a headphone out port, a Bluetooth radio with audio out, a USB port with audio out, and the like. Among other things, the audio output services component 330 can at least enable the audio output-based hardware to playback audio from the mobile computing device 310 based on received instructions, or disable the audio output-based hardware based on received instructions.

The location services component 332 can determine a current physical location of the mobile computing device 310. In various embodiments, the determination of the current physical location can be continuously updated, updated on time intervals, and/or updated once. In any of the foregoing embodiments, the determination can be based on hardware specifications, received instructions, or a combination of the foregoing. In embodiments, the current physical location can be determined based on multi-lateration of radio signals between radio towers of a telecommunications network, GPS coordinates determined from a GPS device of the mobile computing device 310, radio measurements of the mobile computing device 310, Wi-Fi data, or any combination of the above or other known methods.

The visual input services component 334 can receive one or more instructions to control the visual input-based hardware of the mobile computing device 310. The visual input-based hardware can include a camera for receiving digital images and/or video. Among other things, the visual input services component 334 can at least activate the visual input-based hardware to receive visual input data from visual input-based hardware of the mobile computing device 310 based on received instructions, or deactivate the visual input-based hardware to stop the receipt of visual input data from visual input-based hardware of the mobile computing device 310 based on received instructions.

The audio input services component 336 can receive one or more instructions to control the audio input-based hardware of the mobile computing device 310. The audio input-based hardware can include a microphone for receiving audio. Among other things, the audio input services component 336 can at least activate the audio input-based hardware to receive audio input data from audio input-based hardware of the mobile computing device 310 based on received instructions, or deactivate the audio input-based hardware to stop the receipt of audio input data from audio input-based hardware of the mobile computing device 310 based on received instructions.

The telephony services component 340 and the electronic messaging services component 350 can each receive one or more instructions to control, among other things, operations associated with outgoing communications from the mobile computing device 310. The telephony services component 340 can employ a telecommunications radio (not shown) of the mobile computing device to call and establish an outgoing telephone connection with a remote device or telephone, such as any one of the remote devices or telephones of FIG. 1, based on received instructions. The electronic messaging services component 350, on the other hand, can employ the telecommunications radio (not shown), a network communications device (e.g., a Wi-Fi radio), or any other communications component of the mobile computing device, to send an outgoing electronic message to a remote device or telephone, such as any one of the remote devices or telephones of FIG. 1, based on received instructions.

In embodiments, the mobile computing device 310 can include an emergency broadcast configuration component 360 for configuring the initiation, operation, and/or termination of the emergency broadcast mode of the mobile computing device 310. In some embodiments, the emergency broadcast configuration component 360 is an application executing in the application layer of the mobile computing device 310. For instance, the emergency broadcast configuration component 360 can be activated via a "settings" application of the mobile computing device 310. In embodiments, the emergency broadcast configuration component 360 can facilitate the configuration of how the emergency broadcast mode is initiated by a user. With brief reference to FIG. 4, a graphical representation of an exemplary mobile computing device 400 in accordance with embodiments of the present disclosure is provided. The mobile device 400 includes a display 410 and a chassis 420. In some embodiments, the emergency broadcast mode can be initiated on the device 400 in response to the receipt of a preconfigured combination of received hard-key inputs configured on the display 410 (including a display bezel) or chassis 420. The preconfigured combination of hard-key inputs can include any combination of hard-key inputs. By way of example only, hard-keys can include a home button 430, a power button 440, a volume up button 450, a volume down button 460, and any other hard-key buttons available on the device 400. In further embodiments not shown, capacitive touch button inputs can also be included as part of the preconfigured combination for initiating the emergency broadcast mode.

In further, preferred embodiments, the emergency broadcast configuration component 360 is configured to be configured one time, and one time only. For example, many modern mobile computing devices have an "out-of-box" experience, where upon first powering-up or activating a device, a one-time-setup application operating in the application layer is automatically initiated to configure the device with user account information, email addresses, social media accounts, tracking features, and the like. In this regard, in accordance with some embodiments, the emergency broadcast configuration component 360 is initialized upon an initial startup of a new or factory-reset mobile computing device 310. In this way, a technologically savvy threat to the mobile computing device 310 user would not be able to identify or deactivate an emergency broadcast mode of the mobile computing device 310.

Looking now to FIG. 5, an illustration of mobile computing device 500, displaying an exemplary user interface 510 for configuring an emergency broadcast is provided. In the illustration, the user interface 510 illustrates that within one of the initial setup 520 screens, an emergency broadcast mode 530 can be configured. More specifically, a virtual emergency broadcast toggle switch 540 can be provided for display and toggled based on a received touch input corresponding thereto. A virtual "shutdown method" toggle switch 550 can also be provided for display and toggled based on a received corresponding touch input. In embodiments, the "shutdown method," if enabled, can invoke a pseudo-shutdown mode of the mobile computing device. In one embodiment, the pseudo-shutdown mode can be enabled based on a received combination of inputs received during the shutdown process of the mobile computing device 500 being different than a preconfigured combination of inputs for authorizing (i.e., initiating) an actual shutdown of the mobile computing device 500. In further embodiments, the pseudo-shutdown mode can be enabled based on not receiving any inputs within a predetermined duration of time (e.g., 5 seconds, 10 seconds, 60 seconds, etc.) during the shutdown process of the mobile computing device 500.

In some embodiments, a shutdown process can only be invoked after receiving a shutdown command, for instance, a detected press of power button 440. In further embodiments, a shutdown process can only be invoked after receiving an acknowledgement or confirmation that a power-down of the device is desired. For instance, a response (e.g., a touch gesture) confirming a confirmation prompt, such as the "slide down to power off" prompt 720 of FIG. 7, can invoke a shutdown process in accordance with some embodiments. The shutdown process can, in some embodiments, cause the mobile computing device 500 to provide for display an indicator, such as a spinning circle, ball, or a "goodbye" statement 920 as illustrated in FIG. 9, indicating that the shutdown process is in progress.

Looking back now to FIG. 5, the "shutdown method" is enabled, thereby activating a virtual "PIN/Hard-key" toggle switch 560 that can be provided for display and toggled based on a received corresponding touch input. While the illustrated embodiments use the terms "PIN" and "Hard-key", it is within the purview of the provided disclosure that any other types of verification methods are employable in accordance with embodiments described herein. For example, a picture selection verification method can be employed, where a user can pre-configure a secret picture password that can serve as the mobile computing device 500 passcode for at least authorizing or initiating an actual shutdown of the mobile computing device. To this end, the passcode can be a combination of one or more characters, hard-key inputs, capacitive key inputs, gestures, and/or selected images, among other things. In another example, a swipe sequence verification method can be employed, where a user can pre-configure a set or series of swipes or gestures on a pattern or preselected picture, wherein the preconfigured set or series of swipes or gestures can serve as the mobile computing device 500 passcode for at least authorizing or initiating an actual shutdown of the mobile computing device.

In some embodiments, it is contemplated that the device 500 is limited to a single type of "shutdown method" (e.g., one of the PIN method, Hard-key Sequence method, Picture Selection method, Swipe Sequence method, etc.), while other embodiments can facilitate the selection of a preferred method, as illustrated. As will be described with regard to FIGS. 7-9, the PIN method and Hard-key Sequence method are each discreet, but similar, configurations for initiating the emergency broadcast mode.

In embodiments, based on the selected configuration for receiving instructions to initiate the emergency broadcast mode, subsequent instructions (e.g., after the "next" button is selected) can be provided for display as prompts to preconfigure a combination of characters (e.g., a numeric PIN or password) or a combination of hard-key inputs, respectively. A preconfigured combination of hard-key inputs can include any combination of hard-keys, such as buttons 430, 440, 450, 460 and/or any combination of capacitive buttons (not shown) that are positioned on the chassis 420 or bezel of the mobile computing device 500. In other embodiments, based on a selection of a Picture Selection method for receiving instructions to initiate the actual shutdown of the mobile computing device, subsequent instructions (e.g., after the "next" button is selected) can be provided for display as a prompt to select one of a plurality of random images to preconfigure the secret picture password.

In accordance with embodiments described herein, a detection of the preconfigured combination of inputs or a selection of the secret picture password, after invocation of the shutdown process by the user (e.g., by way of the power button, gesture, or other method described above) can be detected by an emergency broadcast trigger detection component 370 to initiate an actual shutdown of the mobile computing device. Moreover, a detection of a different combination of inputs not corresponding to the preconfigured combination of inputs, or a selection of a different picture password not corresponding to the preconfigured secret picture password, after invocation of the shutdown process by the user, can be detected by the emergency broadcast trigger detection component 370 to enable an emergency broadcast mode of the mobile computing device.

By way of an example, particularly of the Hard-key sequence configuration, the user can be prompted to enter any secret combination of hard-key inputs as a way of authorizing (i.e., initiating) an actual shutdown of the mobile computing device 510 during the shutdown process of the mobile computing device 510. In response, the user hits the volume down button 460, power button 440, then the home button 430. Each press of the buttons 460, 440, 430 are logged and stored as a first input combination of hard-key inputs. In some embodiments, the user is prompted again to confirm the sequence of hard-key inputs with a second input combination of hard-key inputs. When the same combination (between the first and second input combination) of inputs is received, the sequence of hard-key inputs is saved as a preconfigured combination of hard-key inputs that correspond to initiating the actual shutdown of the mobile computing device 510. To this end, the preconfigured combination is stored in memory for association with the emergency broadcast trigger detection component 370.

In another example, particularly of the PIN sequence configuration, the user can be prompted to enter any secret combination of touch-based inputs to corresponding virtual keys, such as the virtual keypad 830 illustrated on the user interface 810 of FIG. 8, as a way of authorizing (i.e., initiating) an actual shutdown of the mobile computing device 510. In embodiments directed to the PIN sequence configuration, the user can be prompted to enter a PIN sequence 820 or password to confirm the powering down of the device in response to a detected press of power button 440 or in response to receiving an acknowledgement or confirmation that a power-down of the device is desired, as was described above with regards to FIG. 7.

By way of example only, when configuring the secret combination of touch-based inputs, the user enters the PIN "1234." Each press of the corresponding button on a virtual keypad, such as virtual keypad 830, are logged and stored as a first input combination of PIN inputs. In some embodiments, the user is prompted again to confirm the sequence of PIN inputs. When the same combination of inputs is received, the sequence of PIN inputs is saved as a preconfigured combination of PIN inputs that correspond to initiating the actual shutdown of the mobile computing device 510. To this end, the sequence of PIN inputs can be stored in memory for association with the emergency broadcast trigger detection component 370.

In another example, particularly of the Picture Selection configuration, the user can be prompted to select one of a plurality of images provided for display on a mobile device, such as mobile device 110 of FIG. 1, as a way of authorizing (i.e., initiating) an actual shutdown of the mobile computing device 510. In embodiments directed to the Picture Selection configuration, the user can be prompted to select a secret picture password to confirm the powering down of the device in response to a detected press of power button 440 or in response to receiving an acknowledgement or confirmation that a power-down of the device is desired, as was described above with regards to FIG. 7. In some embodiments, when a user selects the wrong secret picture (purposefully) or chooses not to select a secret picture after a predetermined period of time (e.g., 5 seconds, 10, seconds, 30 seconds, etc.), the emergency broadcast mode can be initiated. In other embodiments, one secret picture can be configured to be a standard "password-type" secret picture that will simply acknowledge and confirm the power-down of the device, while another secret picture can be configured to be an "emergencies only" picture that discreetly initiates the emergency broadcast mode upon its selection.

By way of example only, when configuring the secret picture password, the user selects an image of a red umbrella from a plurality of random images (e.g., an elephant, a picnic table, a soda can, a light bulb, etc.). The selected secret picture password is stored as the secret picture password. In some embodiments, the user is prompted again to confirm the secret picture password. When the same secret picture password is received, it is saved to correspond to, based on various configurations, either initiating the actual shutdown of the mobile computing device or initiating the emergency broadcast mode. To this end, the secret picture password can be stored in memory for association with the emergency broadcast trigger detection component 370.

In another example, particularly of the Swipe Sequence configuration, the user can input a set or series of swipes or gestures on a standard pattern or an preconfigured image provided for display on a mobile device, such as mobile device 110 of FIG. 1, as a way of authorizing (i.e., initiating) an actual shutdown of the mobile computing device 510. In embodiments directed to the Swipe Sequence configuration, the user can be prompted to provide one or more swipes or gestures on a custom, preconfigured image to confirm the powering down of the device in response to a detected press of power button 440 or in response to receiving an acknowledgement or confirmation that a power-down of the device is desired, as was described above with regards to FIG. 7. For example, a preconfigured image can be of the user's dog, and the preconfigured swipe can be a gesture between the left eye, to the nose, to the right eye. In some embodiments, when a user enters the wrong set or series of gestures (purposefully) or chooses not to input the correct set or series of gestures in a predetermined period of time (e.g., 5 seconds, 10, seconds, 30 seconds, etc.), the emergency broadcast mode can be initiated.

By way of example only, when configuring the swipe sequence, the user either uploads an image or takes an picture with a camera of the mobile computing device. Once the picture is selected, the user is prompted to provide a set or series of swipes or gestures corresponding to features of the selected picture. The mobile computing device receives the set or series of swipes or gestures and stores them as a preconfigured set or series of swipes corresponding to a selected picture. In some embodiments, the user is prompted again to confirm the set or series of swipes or gestures corresponding to features of the selected picture. When the same set or series of swipes or gestures is received, it is saved to correspond to, based on various configurations, either initiating the actual shutdown of the mobile computing device or initiating the emergency broadcast mode. To this end, the set or series of swipes or gestures can be stored in memory for association with the emergency broadcast trigger detection component 370.

In reference now to FIG. 6, a mobile computing device 600 having an exemplary user interface 610 for configuring a tracking service in accordance with some implementations of the present disclosure is provided. The tracking service, referenced herein as "Find My Phone" 630, can be configured as a general setting in some embodiments, while in further embodiments, can at least in part be configured as an out-of-box experience of the mobile computing device 600. A virtual tracking service toggle switch 640 can be provided for display and toggled based on a received touch input corresponding thereto. The virtual tracking service toggle switch 640 can enable or disable a tracking service of the mobile computing device 610, as was described herein above. A virtual iterative-location-save toggle switch 550 can also be provided for display and toggled based on a received corresponding touch input. The virtual iterative-location-save toggle switch 550 can, in some embodiments, cause the determined physical location of the mobile computing device 510 to be transmitted, at predefined intervals (e.g., every 5 minutes, every hour, every 2 hours, etc.) to a remote server device, such as remote server device 130, for storage thereon in association with a user account associated with the mobile computing device 610.

In further embodiments, the user interface 610 can include a virtual emergency broadcast mode companion toggle switch 660 that is provided for display and toggled based on a received corresponding touch input. An enabling of the emergency broadcast mode companion toggle switch 660 can provide for display a list 670 of input devices that can be activated, based on corresponding selections thereof, for receiving corresponding input data during the emergency broadcast mode. For instance, the list of input devices can include a microphone, camera, GPS device, Wi-Fi device, and radio, among many others. If, for example, the microphone is selected as an input device to be activated during the emergency broadcast mode, the microphone will be enabled to receive ambient noise picked up by the microphone when the emergency broadcast mode is executing. To this end, in some embodiments, the received input can be sent over a network, such as network 120 of FIG. 1, for storage on a remote server device, such as remote server device 130, with the location data stored in association with the user account of the mobile computing device 600.

Likewise, if the camera is selected as an input device to be activated during the emergency broadcast mode, the camera will be enabled when the emergency broadcast mode is activated to receive any sequence of pictures and/or video, either based on motion detection technology or simply on an iterative basis. To this end, in some embodiments, the received input can be sent over a network, such as network 120 of FIG. 1, for storage on the remote server device, such as remote server device 130, with the location data stored in association with the user account of the mobile computing device 600.

In embodiments, the emergency mode broadcast recipients, such as the selected recipients 580 of FIG. 5, can receive a series of electronic messages including emergency mode data generated during the execution or operation of the emergency broadcast mode, or raw emergency mode data (e.g., microphone input data) via a telephone call. The emergency mode data can include the current physical location of the mobile computing device, audio received as microphone input data, and/or images/video received as camera input data. In further embodiments, the electronic messages or telephone calls can include a link and/or account access information to the tracking service for accessing the emergency mode data stored on the remote server device in association with the mobile computing device broadcasting the emergency mode data. In accordance with some embodiments, telephone calls can include automated text-to-speech audio generated by the mobile computing device that reads out, among other things, the current physical location (e.g., GPS coordinates) of the mobile computing device.

In some further embodiments, a virtual "Bluetooth trigger" toggle switch 570 can be provided for display and toggled based on a received corresponding touch input. To this end, if enabled, subsequent setup screens may enable the device 500 to pair with a wireless trigger for initiating an emergency broadcast mode in accordance with embodiments described herein. While the illustration particularly illustrates a Bluetooth trigger, it is contemplated that any trigger, wired or wireless, can be employed to remotely trigger an emergency broadcast mode in accordance with described embodiments.

The emergency broadcast mode configuration user interface 510 can also include broadcast recipient(s) list 580 operable to receive selections for recipients of the emergency mode data generated in response to the execution or initiation of the emergency broadcast mode. In some embodiments, the selected broadcast recipients can be configured during the initial setup process, can be configured based on selected contacts (e.g., flagged as emergency contacts) stored on the device 500 after initial setup, or can be automatically determined by the device 500 based on location data (e.g., local emergency services).

Referencing back now to FIG. 3, in some embodiments, the mobile computing device 310 can include an emergency broadcast controller component 375 that is activated by the emergency broadcast trigger detection component 370. As was described, the emergency broadcast trigger detection component 370 can determine if a preconfigured sequence of inputs (hard-key, PIN, secret picture password) is received or not received in accordance with a shutdown process of the mobile computing device. In this regard, when the emergency broadcast trigger detection component 370 determines that the preconfigured inputs or passcode is received in accordance with the shutdown process, an instruction is sent therefrom to the components of the operating system and/or hardware to initiate or complete the actual shutdown of the mobile computing device. Further, when the emergency broadcast trigger detection component 370 determines that the preconfigured inputs or passcode is not received (e.g., incorrect inputs, passcode, selection, or no input) in accordance with the shutdown process, an instruction is sent therefrom to the emergency broadcast controller component 375 to initiate each of the pseudo-shutdown blackout component 380, emergency data collection component 385, and emergency broadcasting component 390 by sending initializing and/or activating instructions thereto.

In accordance with embodiments described herein, the pseudo-shutdown blackout component 380 is configured to send instructions to the visual output services component 320 and the audio output services component 330 to deactivate any or all output-generating hardware that may indicate that the mobile computing device 310 is active or powered on. Because the emergency broadcast mode is activated, discreetly during the shutdown process of the mobile computing device, the pseudo-shutdown blackout component is configured to emulate the actual shutdown of the device, to mislead observing parties into thinking that the device 310 is actually shut down.

However, on the contrary, the emergency broadcast controller component 375 has activated the emergency data collection component 385 to obtain emergency mode data for outward emergency communications via the emergency broadcasting component 390. In more detail, the emergency data collection component 385 can activate any one of the location services component 332, visual input services component 334, or the audio input services component 336. In some embodiments, the emergency data collection component 385 can activate any of the foregoing components 332, 334, 336 based on selected hardware components, such as those input devices selected in list 670 of FIG. 6 for receiving input data during operation of the emergency broadcast mode.

Either during or after the obtaining and/or generation of emergency mode data by emergency data collection component 385, the emergency broadcast controller component 375 can send the emergency mode data to the emergency broadcasting component 390 for communication to one or more emergency contacts. More specifically, the emergency broadcasting component 390 can utilize the telephony services component 340 for initiating and establishing telephone calls to any one or more emergency contacts or local emergency service providers based on selected emergency broadcast recipients, such as those recipients 580 selected on FIG. 5 during the configuration of the emergency broadcast mode. Similarly, the emergency broadcasting component 390 can utilize the electronic messaging services component 350 for generating and sending electronic messages (e.g., SMS messages, email messages, messaging platform messages, etc.) to any one or more emergency contacts or local emergency service providers based on selected emergency broadcast recipients, such as those recipients 580 selected on FIG. 5 during the configuration of the emergency broadcast mode.

Having described various aspects of the present disclosure, exemplary methods are described below for broadcasting emergency alerts from a mobile computing device. Referring to FIG. 10 in light of FIGS. 1-7 and 9, FIG. 10 is a flow diagram showing a method 1000 for discreetly initiating and broadcasting personal emergency alerts. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1010, a shutdown command is received on a mobile computing device. The shutdown command is received to initiate a shutdown process of the mobile computing device. For instance, the shutdown command can be received in response to a determination that a power button, such as power button 440 of FIG. 4, was activated (e.g., pressed). In another example, the shutdown command can be received in response to a determination that a confirmation to activate the shutdown process, as illustrated by prompt 720 of FIG. 7, has been received.

At block 1020, the mobile computing device begins monitoring for a preconfigured combination of hard-key inputs during the shutdown process. The preconfigured combination of hard-key inputs corresponds to authorizing and/or initiating an actual shutdown of the mobile computing device. Any combination of hard-key inputs that does not correspond to authorizing and/or initiating the actual shutdown can trigger an emergency broadcast mode of the mobile computing device. As was described, the preconfigured combination of hard-key inputs and the emergency broadcast mode can be configured in a general settings portion or an initial setup portion of the mobile computing device. The preconfigured combination can be defined as a customized sequence of hard-key inputs in the configuration of the emergency broadcast mode.

At block 1030, a pseudo-shutdown mode of the mobile computing device is enabled based on either a different combination of hard-key inputs not corresponding to the preconfigured combination of hard-key inputs being received, or no hard-key inputs being received within a predefined duration of time. The pseudo-shutdown mode is, as is described, a state of the mobile computing device that is activated to emulate an actual shutdown state of the mobile computing device. For instance, all visual, audio, and video output devices are deactivated so that the phone appears to be in a deactivated state.

However, as shown at block 1040, the mobile computing device, while in the pseudo-shutdown mode, starts an emergency broadcast mode that initiates outgoing emergency communications to select emergency broadcast recipients. The emergency communications can include the delivery of electronic messages (e.g., SMS, MMS, email, messaging packet) or the initiation of an outgoing telephone call to select emergency broadcast recipients, as were selected as a configuration option 580 of FIG. 5.

If communications are interrupted, by way of a poor signal or interruption, the emergency broadcast mode can reinitiate the outgoing emergency communications to the select emergency broadcast recipients in response to the detected interruption. The emergency communications can include a current physical location (e.g., GPS coordinates) determined by the mobile computing device, which can be included in an electronic message or dictated, for instance, by a voice-to-text emulator.

The emergency broadcast mode can also initiate a network connection with a remote server device configured to receive the emergency mode data and store it in a memory for association with the mobile computing device. Based on the established network connection with the remote server device, the mobile computing device can send the determined physical location, microphone input data, and/or camera input data for storage on the remote server device for access by anyone with credentials for accessing the data. To this end, the emergency broadcast mode can send, via electronic message, to the emergency broadcast recipients, a URL and/or credentials for accessing the emergency mode data associated with the mobile computing device.

The emergency broadcast mode can also be disabled, while the pseudo-shutdown mode is enabled, in response to a detection of the preconfigured combination of hard-key inputs. In this regard, while the phone appears to be shut down, but is actually transmitting emergency mode data, a determination that the preconfigured combination of hard-key inputs is received can disable at least the emergency broadcast mode, and/or the pseudo-shutdown mode in some embodiments.

Referring now to FIG. 11 in light of FIGS. 1-9, FIG. 11 is a flow diagram showing a method 1100 for discreetly initiating and broadcasting personal emergency alerts. Each block of method 1100 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1110, a shutdown command is received on a mobile computing device. The shutdown command is received to initiate a shutdown process of the mobile computing device. For instance, the shutdown command can be received in response to a determination that a power button, such as power button 440 of FIG. 4, was activated (e.g., pressed). In another example, the shutdown command can be received in response to a determination that a confirmation to activate the shutdown process, as illustrated by prompt 720 of FIG. 7, has been received.

At block 1120, a passcode interface having one or more passcode inputs (e.g., numbers, letters, characters, images, etc.) is provided for display on a mobile computing device to receive a passcode to authorize and/or initiate an actual shutdown of the mobile computing device. To this end, it can be provided for display in response to a shutdown command being received on the mobile computing device. In embodiments, touchscreen inputs corresponding to one or more of the passcode inputs can be received via the displayed passcode interface.

At block 1130, a pseudo-shutdown mode of the mobile computing device is enabled based on either the received passcode or selected picture from a plurality of displayed random pictures not corresponding to the preconfigured passcode or preconfigured secret picture password, respectively. The pseudo-shutdown mode can also be enabled when no passcode is received or no picture is selected within a predefined duration of time. In another embodiment, the pseudo-shutdown mode of the mobile computing device is enabled based on the secret picture password being selected. The pseudo-shutdown mode is, as is described, a state of the mobile computing device that is activated to emulate an actual shutdown state of the mobile computing device. For instance, all visual, audio, and video output devices are deactivated so that the phone appears to be in a deactivated state.

However, as shown at block 1140, the mobile computing device, while in the pseudo-shutdown mode, starts an emergency broadcast mode that initiates outgoing emergency communications to select emergency broadcast recipients. The emergency communications can include the delivery of electronic messages (e.g., SMS, MMS, email, messaging packet) or the initiation of an outgoing telephone call to select emergency broadcast recipients, as were selected as a configuration option 580 of FIG. 5.

If communications are interrupted, by way of a poor signal or interruption, the emergency broadcast mode can reinitiate the outgoing emergency communications to the select emergency broadcast recipients in response to the detected interruption. The emergency communications can include a current physical location (e.g., GPS coordinates) determined by the mobile computing device, which can be included in an electronic message or dictated, for instance, by a voice-to-text emulator.

The emergency broadcast mode can also initiate a network connection with a remote server device configured to receive the emergency mode data and store it in a memory for association with the mobile computing device. Based on the established network connection with the remote server device, the mobile computing device can send the determined physical location, microphone input data, and/or camera input data for storage on the remote server device for access by anyone with credentials for accessing the data. To this end, the emergency broadcast mode can send, via electronic message, to the emergency broadcast recipients, a URL and/or credentials for accessing the emergency mode data associated with the mobile computing device.

The emergency broadcast mode can also be disabled, while the pseudo-shutdown mode is enabled, in response to a detection of a power-up command (e.g., an extended depression of the power button) received on the mobile computing device. In this regard, while the phone appears to be shut down, but is actually transmitting emergency mode data, a determination that the power button was pushed long enough to "turn on" the device is received to disable at least the emergency broadcast mode, and/or the pseudo-shutdown mode in some embodiments.

Figure 12:
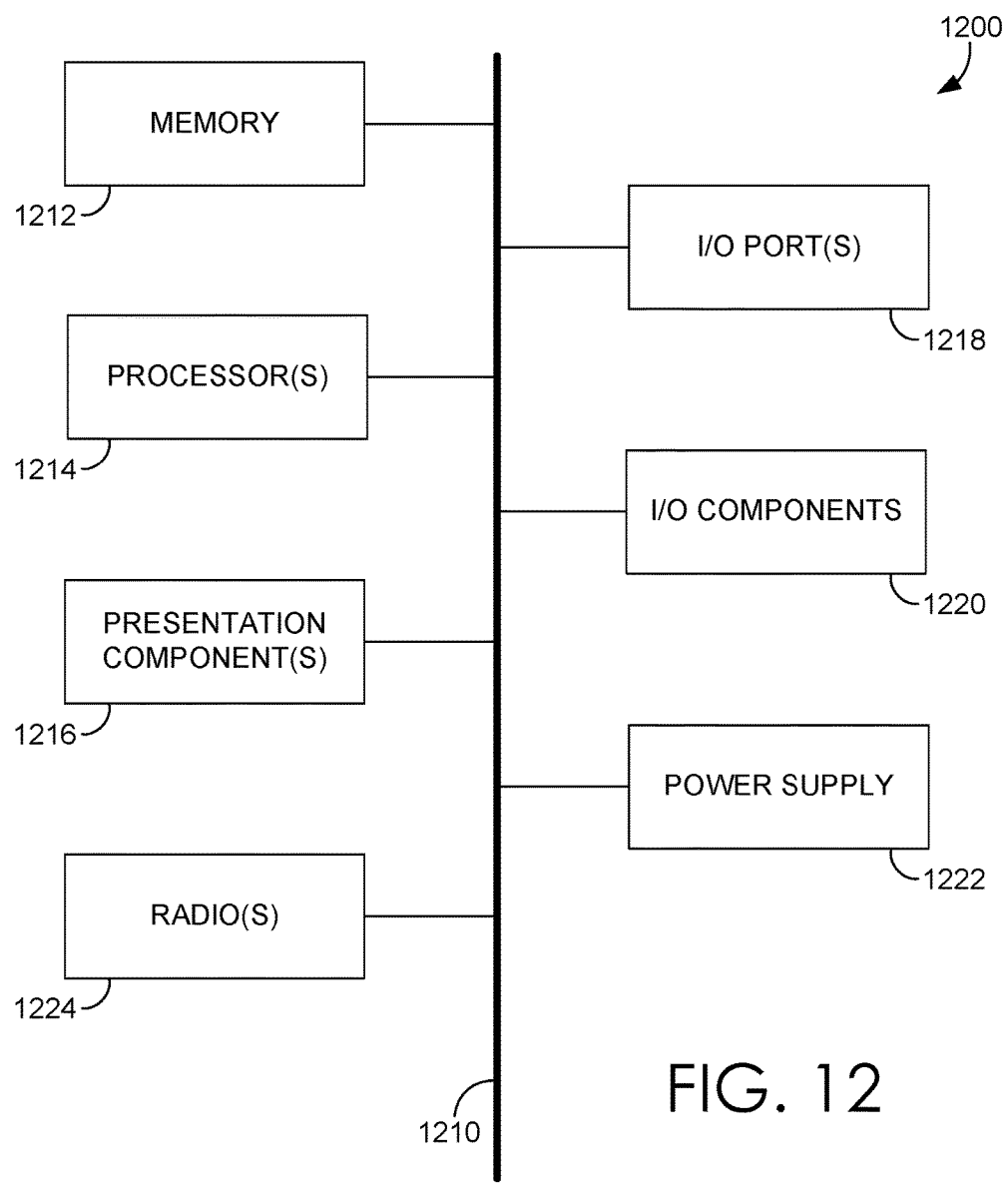
FIG. 12 is a block diagram of an exemplary computing environment suitable for use in implementations of the present disclosure.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As described above, implementations of the present disclosure provide for discreetly initiating emergency broadcast communications from a mobile computing device. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   receiving, on a mobile computing device, a shutdown command to initiate a shutdown process of the mobile computing device;
   monitoring for a preconfigured combination of hard-key inputs that, upon a detection thereof, advances the shutdown process;
   enabling while monitoring for the preconfigured combination of the hard-key inputs, invoking a pseudo-shutdown mode of the mobile computing device based on either a detection of a different combination of hard-key inputs, or a failure to detect the preconfigured combination of the hard-key inputs within a period of time; and
   starting an emergency broadcast mode of the mobile computing device based on the pseudo-shutdown mode having been invoked, wherein at least one silent emergency communication is discreetly initiated by the mobile computing device upon the start of the emergency broadcast mode.

2. The medium of claim 1, wherein visual output components and audio output components of the mobile computing device are disabled based on the invocation of the pseudo-shutdown mode.

3. The medium of claim 1, wherein the at least one silent emergency communication includes:
   a discreet electronic message to at least one emergency electronic contact address, the discreet electronic message including at least a determined current physical location of the mobile computing device.

4. The medium of claim 1, wherein the at least one silent emergency communication includes a discreet telephone call to a local emergency service provider.

5. The medium of claim 4, wherein when in the emergency broadcast mode, the mobile computing device is configured to:
   determine an interruption in telephone service; and
   reinitiate the discreet telephone call to the local emergency service provider in response to the determined interruption in the telephone service.

6. The medium of claim 1, wherein the at least one silent emergency communication includes:
   a network communication, by the mobile computing device and to a remote server device, discreetly indicating at least a determined current physical location of the mobile computing device.

7. The medium of claim 6, wherein
   the network communication includes at least one of voice data discreetly obtained via a microphone of the mobile computing device and image data discreetly obtained via a camera of the mobile computing device.

8. The medium of claim 1, the operations further comprising:
   after the pseudo-shutdown mode has been invoked, disabling the emergency broadcast mode in response to another detection of the preconfigured combination of the hard-key inputs.

9. A computer-implemented method for discreetly sending distress communications from a mobile computing device, the method comprising:
   receiving, by the mobile computing device, a shutdown command to initiate a shutdown process of the mobile computing device;
   providing for display, by the mobile computing device, a passcode interface to receive a preconfigured passcode that advances the shutdown process;
   invoking, by the mobile computing device, a pseudo-shutdown mode of the mobile computing device based on a receipt of one of a different passcode or a failure to receive the preconfigured passcode within a period of time; and
   starting, by the mobile computing device, an emergency broadcast mode based on the pseudo-shutdown mode having been invoked, wherein at least one silent emergency communication is discreetly initiated by the mobile computing device when in the emergency broadcast mode.

10. The method of claim 9, wherein the preconfigured passcode is required to advance the shutdown process of the mobile computing device.

11. The method of claim 9, wherein the passcode interface is provided for display in response to receiving the shutdown command.

12. The method of claim 9, wherein visual output components and audio output components of the mobile computing device are disabled based on the invocation of the pseudo-shutdown mode.

13. The method of claim 9, wherein the at least one silent emergency communication includes:
   a discreetly-generated electronic message addressed to at least one emergency electronic contact address, the discreetly-generated electronic message indicating a determined current physical location of the mobile computing device.

14. The method of claim 9, wherein the at least one silent emergency communication includes a discreet telephone call to a local emergency service provider.

15. The method of claim 9,
   wherein the at least one silent emergency communication includes a network communication, from the mobile computing device to a remote server device, discreetly indicating a determined current physical location of the mobile computing device.

16. The method of claim 15, the network communication including at least one of voice data obtained via a microphone of the mobile computing device and image data obtained via a camera of the mobile computing device.

17. The method of claim 9, further comprising:

receiving, by the mobile computing device, a power-up command to provide for display the passcode interface; and disabling, by the mobile computing device after receiving the power-up command, the emergency broadcast mode in response to another receipt of the preconfigured passcode.

18. A mobile computing device for discreetly sending distress communications, the mobile computing device comprising:

an emergency broadcast configuration component to preconfigure a combination of key inputs that, when detected by the mobile computing device during a shutdown process of the mobile computing device, advances the shutdown process;

an emergency broadcasting component to initiate at least one silent emergency communication in response to a start of an emergency broadcast mode, wherein the emergency broadcast mode is started based on a pseudo-shutdown mode having been invoked;

a pseudo-shutdown blackout component to disable, based on the pseudo-shutdown mode having been invoked, visual output components and audio output components of the mobile computing device, wherein the pseudo-shutdown mode is invoked during the shutdown process based on one of a detection of a different combination of key inputs or a failure to detect the preconfigured combination of the key inputs;

an emergency broadcast trigger detection component to monitor key inputs detected during the shutdown process; and an emergency broadcast controller component to start the emergency broadcast mode based at least in part on the emergency broadcast trigger detection component having failed to detect the preconfigured combination of key inputs during the shutdown process, and further in part on the pseudo-shutdown blackout component having disabled the visual and audio output components of the system.

19. The system of claim 18, wherein the at least one silent emergency communication includes at least one of a discreet telephone call and a discreet electronic message.

20. The system of claim 18, the emergency broadcast configuration component to preconfigure the combination of key inputs during an initial setup process of the system.

* * * * *